United States Patent [19]

Heil et al.

[11] Patent Number: 5,672,629
[45] Date of Patent: Sep. 30, 1997

[54] TWO-STAGE REFORMING OF METHANOL

[75] Inventors: Dietmar Heil, Schwendi; Uwe Benz, Uhldingen, both of Germany

[73] Assignee: Daimler-Benz AG, Stuttgart, Germany

[21] Appl. No.: 488,660

[22] Filed: Jun. 8, 1995

[30] Foreign Application Priority Data

Jun. 15, 1994 [DE] Germany ............... 44 20 752.2
Jun. 15, 1994 [DE] Germany ............... 44 20 753.0

[51] Int. Cl.$^6$ ............................................ C07C 27/00
[52] U.S. Cl. ................................................. 518/704
[58] Field of Search ........................... 518/704; 252/373

[56] References Cited

U.S. PATENT DOCUMENTS

| | | |
|---|---|---|
| 4,083,695 | 4/1978 | Haese et al. . |
| 4,088,450 | 5/1978 | Kosaka et al. . |
| 4,110,359 | 8/1978 | Marion ................ 260/449.5 |
| 4,670,187 | 6/1987 | Schurmans et al. . |
| 4,865,624 | 9/1989 | Okada ........................ 48/61 |
| 5,252,609 | 10/1993 | Pinto ........................ 518/703 |

FOREIGN PATENT DOCUMENTS

| | | |
|---|---|---|
| 0 361 648 | 4/1990 | European Pat. Off. . |
| 32 45 636 | 6/1984 | Germany . |
| 36 31 366 | 3/1988 | Germany . |
| 1374301 | 11/1974 | United Kingdom . |
| WO88/01983 | 3/1988 | WIPO . |

OTHER PUBLICATIONS

Patent Abstract of Japan 3–95268 dated Nov. 13, 1992.
Patent Abstract of Japan 63–165906 dated Jan. 22, 1990.
Patent Abstract of Japan 63–166701 dated Jul. 9, 1988.
Patent Abstract of Japan 61–183102 dated Aug. 15, 1986.
Patent Abstract of Japan 60–246202 dated Dec. 5, 1985.
Patent Abstract of Japan 5–43201 dated Feb. 23, 1993.
Patent Abstract of Japan 59—184705 dated Oct. 10, 1984.

*Primary Examiner*—Marianne M. Cintins
*Assistant Examiner*—Karl J. Puttlitz, Jr.
*Attorney, Agent, or Firm*—Evenson, McKeown, Edwards & Lenahan P.L.L.C.

[57] ABSTRACT

This invention relates to a process and an apparatus for the catalytic water vapor reforming of methanol. The reforming process is carried out in two stages. The methanol is incompletely reacted in the first stage in a heat-transfer-optimized process with a high specific catalyst load. In a reaction-optimized second stage, while the specific catalyst load is lower, a further reaction is carried out which completes the methanol reaction. In addition, a tube bundle reactor is disclosed in which the first, heat-transfer-optimized stage takes place in reaction tubes which, for constructing heat transfer medium ducts, are each surrounded by a concentric outer tube, while the second, reaction-optimized stage is carried out after the return of the reform gas in the housing. The reaction tubes as well as the area between the outer tubes are filled with catalyst material.

5 Claims, 4 Drawing Sheets

TWO-STAGE REFORMING OF METHANOL

This invention relates to a process and an arrangement for the catalytic water vapor reforming of hydrocarbons, particularly methanol in two stages.

From U.S. Pat. No. 4,865,624, a two-stage process and an arrangement for the catalytic water vapor reforming of methanol is known in which, by means of a heat transfer oil, the two stages are maintained at predetermined temperature levels independently of one another. From German OS 36 31 366 A1, a two-stage arrangement for the catalytic reforming of gaseous hydrocarbons by means of water vapor is also known which is constructed as a tube bundle reactor and in the case of which the reaction tubes are constructed as a first stage and the space between the reaction tubes, for forming the second stage, is also filled with catalyst. In this case, after the flow has taken place through the first stage, energy is again added to the reaction gas outside the actual reaction space (the reaction gas is overheated) in order to permit continuation of the reaction.

The first arrangement according to U.S. Pat. No. 4,865,624 has the disadvantage that, in principle, both stages have the same construction. This means that both stages require the same high construction expenditures for the heating or the temperature control of the process. For each of the reactions, a high proportion of the constructional volume is taken up by the heat transfer medium. Altogether, this leads to large values with respect to the thermal capacity, the mass and the volume.

Although, in contrast, the second arrangement according to German OS 36 31 366 A1 has a clearly reduced proportion of space for the heat transfer medium in the reactor, it also requires space and constructional expenditures in the actual reactor for overheating the reaction gases. The resulting ratio of the catalyst mass to the overall reactor volume and of the catalyst mass to the overall mass is therefore unfavorable.

It is an object of the invention to provide a process and an arrangement for the efficient water vapor reforming of hydrocarbons which meets the special requirements in mobile use with respect to the weight, volume, dynamics and constructional expenditures.

According to the invention, this object is achieved by providing a two-stage process in which no more than 50% of the catalyst charge is used in the first stage and at least 50% of the catalyst is used in the second stage.

The adaptation of the reforming process to the above-mentioned special requirements for the mobile use by means of a two-stage process is carried out as follows:

Lay-out and operation of the first stage as a heat-charge-optimized stage with the goal of only an incomplete reaction of the hydrocarbon (reaction at approximately 60–90% at nominal load), lay-out and operation of the second stage only slightly heated or unheated in a residual-reaction-optimized stage with a ratio of the catalyst volume to the overall reactor volume which is as high as possible.

Another significant criterion in the case of the invention is the minimizing of the space required in the reactor for the heat transfer medium. Particularly when liquid heat transfer mediums are used, this is particularly important for reducing the thermal capacity which is a decisive factor for the cold-start characteristics.

The scope of this invention expands the two-stage principle to more stages in the case of a transition from a heat-charge-optimized design to a residual-reaction-optimized design of the individual reactor stages.

The important advantage of carrying out the reaction in two or several stages is therefore that, for each stage, in a reactor-construction-specific and reaction-specific manner, the significant parameters can be optimized, such as the reactor geometry (running length, tube diameter, plate distances, specific heat exchange surface), the catalyst type, catalyst grain size and catalyst quantity, the operating temperature and temperature gradients, the flow rate, residence time and pressure loss.

In one preferred embodiment, a tube bundle reactor is used. After flowing through the reactor tubes, the reform gas returns to the housing interior. The reaction tubes containing catalyst form the first stage. Each tube is surrounded by a concentric outer tube carrying heat transfer medium. These outer tubes are surrounded by catalyst. The reactor shell thus forms the second stage. This arrangement has the advantage that, in comparison to conventional tube bundle reactors, only a little space is required for the heat transfer medium. While, in the case of conventional tube bundle reactors, the heat transfer medium fills the whole space between the tubes and the common housing, in the suggested arrangement, this space is used for the catalyst and the reaction. In this case, the heat transfer medium is guided in the annular gap of the concentric tubes. As a result, a good heat transfer is achieved on the inner and outer tube which can be further improved by means of guiding structures or the providing of grooves, as customary in the case of double safety tubes. By means of the arrangement of guiding structures in the reaction tubes, a good heat transfer can also be ensured from the tube wall to the reforming gas or the effective heat transfer surface can be enlarged. At the same time, the proportion of the catalyst volume in the total volume is very high. On the whole, an extremely compact arrangement can therefore be provided for the reforming.

Additional advantages and further embodiments will in part be described and in part become apparent from the detailed description which makes reference to the accompanying drawings.

The production of hydrogen from hydrocarbons is customary in the chemical industry. Also for the applications in mobile systems, the on-board production of hydrogen from hydrocarbons is of increasing interest because of the very high storage density of the hydrogen in the chemically bound form. This applies mainly to the storage in the form of liquid hydrocarbons, such as methanol. In the case of the water vapor reforming of hydrocarbons, a mixture of hydrocarbon and water is converted into a vapor state with the addition of heat on a suitable catalyst. The following equations are relevant for methanol:

| | | |
|---|---|---|
| Pyrolysis: | $CH_3OH \rightarrow 2 H_2 + CO$ | (1) |
| Water vapor shift reaction: | $CO + H_2O \rightarrow CO_2 + H_2$ | (2) |
| Water vapor reforming: | $CH_3OH + H_2O \rightarrow 3 H_2 + CO_2$ | (3) |

The reaction according to Equation (1) is highly endothermic; reaction (2) is slightly exothermic; and the summation reaction (3) is very endothermic.

In the case of mobile applications, for example, in the case of water vapor reforming for fuel cells in motor vehicles, in contrast to the application in the chemical industry, in addition to the requirement to a high yield of hydrogen, or a correspondingly high hydrocarbon reaction, the following requirements are also essential:

low reactor mass;

low reactor volume;

low constructional expenditures and therefore low costs;

good dynamic characteristics; that is, also a low thermal mass or thermal capacity for a fast cold start.

Figure 8:
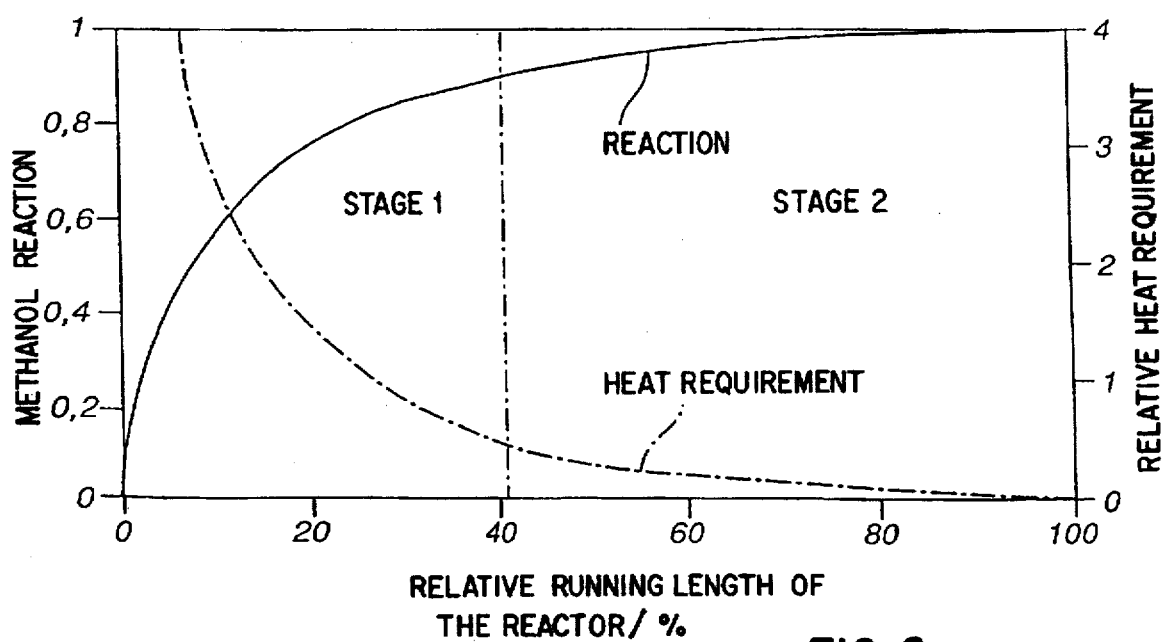
FIG. 8 is a diagram of the methanol reaction and the heat requirement during the water vapor reforming of methanol as a function of the running length in an isothermal reactor.

The diagram according to FIG. 8 illustrates the heat requirement and the methanol reaction in the case of the water vapor reforming of methanol as a function of the relative running length in an isothermal reactor. An analysis of this process shows that, in the ideal case, that is, in the case of a very good heat charge or an isothermal implementation of the reaction, in the starting area of the reactor, the reaction progresses very rapidly while the energy requirement is very high. In the illustrated example, after approximately 40% of the running length; that is, after the flow-through of 40% of the catalyst quantity, a reaction of 90% is reached and also 90% of the energy is consumed. For the residual reaction from 90% to 99%, only approximately 9% of the thermal energy but 60% of the catalyst quantity is required.

The experiment also shows that the water vapor reforming according to Reaction (3) is first limited with respect to the heat charge. This means that, in the inlet area of the reactor, the thermal energy must be made available effectively or must be brought to the reaction site on the catalyst. If this is successful, a very high volume flow of hydrogen can be produced per catalyst mass. A compact reactor must therefore be equipped with a high specific heat exchange surface and must be heated as effectively as possible. High constructional expenditures are required for this purpose.

As soon as the largest proportion of the hydrocarbon is reacted and thus the largest proportion of the heat requirement is supplied, the reaction in the experiment is found to be limited with respect to the mass transfer. This means that, for a complete reaction, a sufficient quantity of catalyst is required (active surface and residence time in the reaction space).

It is a general object of the invention to obtain, by means of this two-stage principle, finally a more compact and lower-cost construction than is possible by means of single-stage reactors which, with respect to the above-mentioned limitations are constructed as a compromise in the process.

In order to optimize the first stage with respect to the charging of heat, this first stage is provided with a high specific heat exchange surface, preferably larger than 250 $m^2/m^3$. In this case, by means of suitable measures, for example, the ribbing of the surfaces or by means of inserts with a good heat-conducting capacity, the heat exchange surface can be increased in the area of the heat transfer medium and particularly in the reaction area. At the same time, the heat transport paths in the catalyst are minimized in that gap widths are reduced preferably to values of less than 15 mm, or the tube diameters are preferably reduced to values of less than 20 mm. However, this results in increased constructional expenditures for this stage and thus in a relatively unfavorable ratio of the catalyst mass to the overall mass of the first stage. This makes it necessary to load the catalyst as much as possible; preferably by means of loads larger than 10 $Nm^3/h$ $H_2$ per kilogram of catalyst in order to keep the absolute quantity of the catalyst and therefore the weight and the volume of the first stage low. In order to reduce marginal running effects in the case of the gap widths which are now smaller in comparison to otherwise customary technical constructions, and in order to effectively utilize the catalyst, which is now clearly improved thermally in the case of very high loads, it is required to reduce the grain size of the catalyst by means of suitable measures, preferably to dimensions smaller than 2 mm.

Another possibility of increasing the utilization of the catalyst in the first stage is the raising of the reactor temperature or of the temperature of the heat transfer medium. As a result, despite the lowering of the temperature in the catalyst because of the high specific heat consumption, that is, despite a high temperature gradient between the heat transfer medium and the catalyst, the catalyst itself is maintained at a high temperature and therefore at a high activity.

In the first stage, the hydrocarbon is only partially reacted, preferably at 60–90% at a nominal load. Since, in the case of the high specific catalyst load, while at the same time, the reaction-side heat transfer and mass transfer are desired to be high, high flow rates are to be endeavored, and since the catalyst grain size is smaller than generally customary, the running length of the first stage should be kept low, preferably less than 50 cm, in order to reduce the pressure course on the reaction side.

For the residual reaction, the second stage requires only approximately 10–40% of the reaction heat, however, at preferably more than 50% of the total catalyst quantity. As a result, the constructional expenditures for the charging of the heat can clearly be reduced. Preferably, the specific heat exchange surface may be reduced to be smaller than 100 $m^2/m^3$ or the charging of the heat can increasingly be implemented by ribs. Depending on the coordination of the first and the second stage, only a slight heating is necessary. In particular, a very compact electric heater can be used here which, for reasons of efficiency, cannot be used in the first stage. However, the reaction may also be carried out adiabatically without any addition of heat. A portion of the reaction energy can also be utilized in the form of latent heat in the reaction gas itself, particularly if the second stage is operated at a lower temperature level. Furthermore, a lower temperature level in the second stage shifts the reaction balance in favor of a lower CO-content in the product gas. This is advantageous particularly for the further gas purification in a system for generating current by means of PEM fuel cells.

Because of the simpler construction of the second phase, the ratio of the reaction mass to the catalyst mass can be kept low, preferably less than 2:1. The ratio of total reactor volume to catalyst volume can be reduced to almost 1. The content of heat transfer fluid in the second phase may clearly be reduced or no heat transfer fluid at all may be used. Also in the second phase, it is advantageous to reduce the catalyst grain size to less than 2 mm in order to improve the mass transfer operations. In comparison to the first stage, in the case of tube bundle or plate reactors, the tube diameters or plate diameters clearly are larger.

Figure 1:
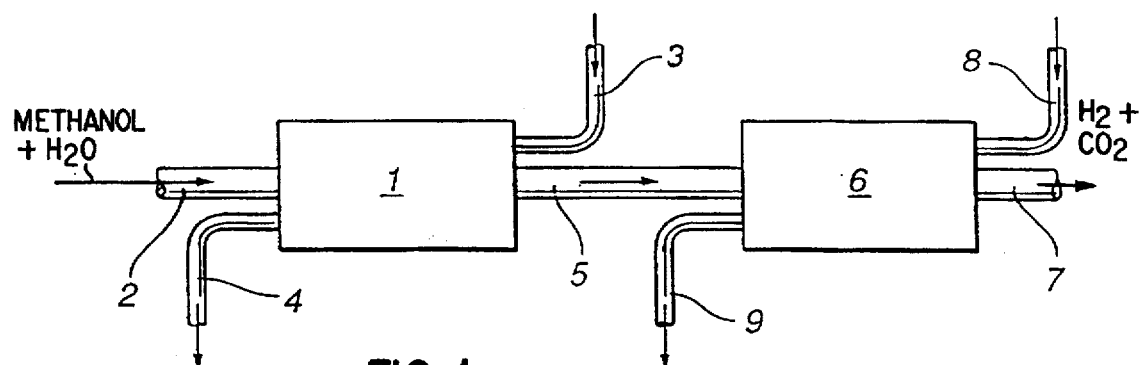
FIG. 1 is a schematic diagram of the basic construction of an arrangement according to the invention.

FIG. 1 schematically illustrates a two-stage arrangement for reforming methanol, comprising a first reactor 1 and a second reactor 6. The methanol/water vapor mixture is fed to the first reactor 1 by way of a feeding pipe 2. In addition, heat transfer medium is supplied to reactor 1 by way of a first heating pipe 3 and, after flowing through the reactor 1, is discharged by way of a first outflow pipe 4. In this case, only a partial reaction of the methanol is achieved in the first reactor 1, typically approximately 60–90% relative to the maximal load. After flowing through the reactor 1, the gas mixture, which therefore still contains significant fractions of unreacted ducts, is further conveyed by way of a connection pipe 5 to a second reactor 6. The product gas formed during the reforming, which is predominantly a mixture of hydrogen and carbon dioxide, is subsequently carried off by way of an outlet pipe 7. The second reactor 6 has a residual-reaction-optimized construction; that is, it contains larger amounts of catalyst material which, while the heat charge is less, is subjected to lower stress. By way of a second heating pipe 8, a heat transfer medium can also be supplied to the second reactor 6, which heat transfer medium is then carried away again by way of a second flow-off pipe 9. In principle, liquid as well as gaseous heat transfer mediums may be used in this case. Because of the lower heat output requirement, particularly the second reaction stage 6 may also be heated electrically. As a result, the fraction of active mass required for the heat charge may be reduced. The precise construction of the two reactors 1, 6 is described in detail below by means of FIGS. 2 to 7.

By means of the above-described arrangement, the reforming of the methanol/water vapor mixture is carried out in a two-stage process. The first stage, which takes place in the first reactor 1 and has a high specific heat exchange surface, is optimized with respect to the coupling in of heat from the heat transfer medium to the catalyst material or the gas to be reformed. In this case, the reaction of the methanol is carried out at a temperature of from 250°–400° C. and possibly at a high temperature gradient from the heat transfer medium to the catalyst, the reaction degree in this first stage preferably amounting to 60–90% relative to the maximal load.

In the second stage, the conversion of methanol will then be completed. For this purpose, this second stage 6 should have a favorable ratio of reactor mass to catalyst mass. In addition, for reducing the CO-content, the second stage may be operated at lower temperatures or only slightly heated or adiabatically. A catalyst is also used for the second stage 6, in which case different catalysts may be used in the two stages 1, 6 which are optimized for the respective process. It is also possible to integrate both stages in a common arrangement, whereby external connection pipes are saved and, as a result, the compactness can clearly be increased. The whole reaction is carried out under pressure, preferably at 1–20 bar.

Three possibilities exist for the combination of the two stages 1, 6, in which case, in principle, the first stage 1 is optimized with respect to the heat charge and the second stage 6 is optimized with respect to the reaction. The first possibility consists of carrying out the water vapor reforming at 250°–350° C. in both stages 1, 6. Furthermore, the second stage 6 may also be carried out at lower temperatures, preferably 150°–250° C., the CO-shift reaction preferably taking place in this case. In the third possibility, the pyrolysis exclusively is carried out in the first stage 1 at 250°–350° C., in which case, in the second stage 6, the CO-shift reaction is preferably carried out again at 150° C.–250° C.

In the art, tube bundle reactors are customary in which the reaction is carried out in one stage. However, the conventional reactors have the basic difficulty that, in the case of the small tube diameters required here and because of the minimally possible tube spacing which is required as a result of manufacturing, the packing density of the bundle of pipes is limited which has the result that the fraction of the catalyst in the total reactor volume amounts to maximally approximately 50%. The largest fraction of the residual volume is filled by the heat transfer medium. As a result, space is lost and, in the case of a liquid heat transfer medium, the thermal capacity of the whole reactor will rise; that is, the warm-up time during a cold start will be extended.

Also, in the case of conventional tube bundle reactors, irrespective of the heat requirement in the whole reaction space which differs considerably as a function of the running length, the same expenditures are applied for supplying the reaction with heat; that is, the heat exchange surface per catalyst quantity is constant. This has the result that, as a compromise, the heat charge in the frontal area of the reactor is generally too poor, whereas, in the rearward area, because of the excess of offered heat exchange surface, the heat charge is better than necessary. Another important lay-out criterion is the pressure loss in the reaction space. Since the cross-sectional surface and the catalyst grain size are constant in the conventional reactor, in the case of these two parameters, a compromise must be made also with respect to the pressure loss.

In contrast, in the case of plate reactors, on the one hand, the fraction of the catalyst volume in the overall volume can be raised; on the other hand, the space taken up by the heat transfer medium can be reduced considerably. Another advantage of plate reactors in comparison to conventional tube bundle reactors is the modular construction; that is, the output quantity can be increased or reduced by adding or removing individual cell units consisting of a reaction space and a space for the heat transfer medium respectively.

The basic construction of a plate-shaped reactor 16 will now be described in detail by means of FIGS. 2 and 3, in which case only one individual cell is illustrated. The whole plate reactor 16 may be constructed of a plurality of such individual cells. In the embodiment according to FIG. 2, the plate reactor 16 consists of several separating plates 10, by which reaction ducts 11 and heating ducts 12 are alternately formed. A catalyst charge 13 is entered in the reaction duct 11, to which the methanol/water vapor mixture is fed by way of the feeding pipe 2. In addition, a supporting or flow guiding structure 14 is entered between the separating plates 10 which form the heating duct 12. The heating ducts 12 are supplied with the heat transfer medium by way of the heating pipe 3, 8. In this case, the heat exchange can be improved on the heat-delivering as well as the heat-receiving side, by means of heat conducting structures, such as ribs.

As an alternative to the use of a heat transfer medium with a reactor-external feeding of the thermal energy and the subsequent heat emission in the reactor, the reactor may also be heated directly by means of the catalytic combustion of a burnable gas. The plate construction is also very suitable for this purpose. In this case, the heating duct is charged by means of a suitable oxidation catalyst. In contrast to the conventional tube bundle reactor, in this case, because of the clearly lower volume and the clearly smaller gap widths in the heat transfer space, the exothermal catalytic combustion may be carried out in a reliable manner. By means of suitable measures, the heat production can be locally adapted by the exothermal reaction to the heat requirement in the case of the endothermal reforming reaction. Advantages of this arrangement are the elimination of a separate heat transfer medium circuit, the possible local adaptation of the specific heat output and of the temperature level to the requirement of the reforming reaction. Because of the clearly lower heat requirement, the catalytic conversion may not be necessary for the second stage and the required energy may be made available directly by cooling the exhaust gas of the first stage.

Figure 2:
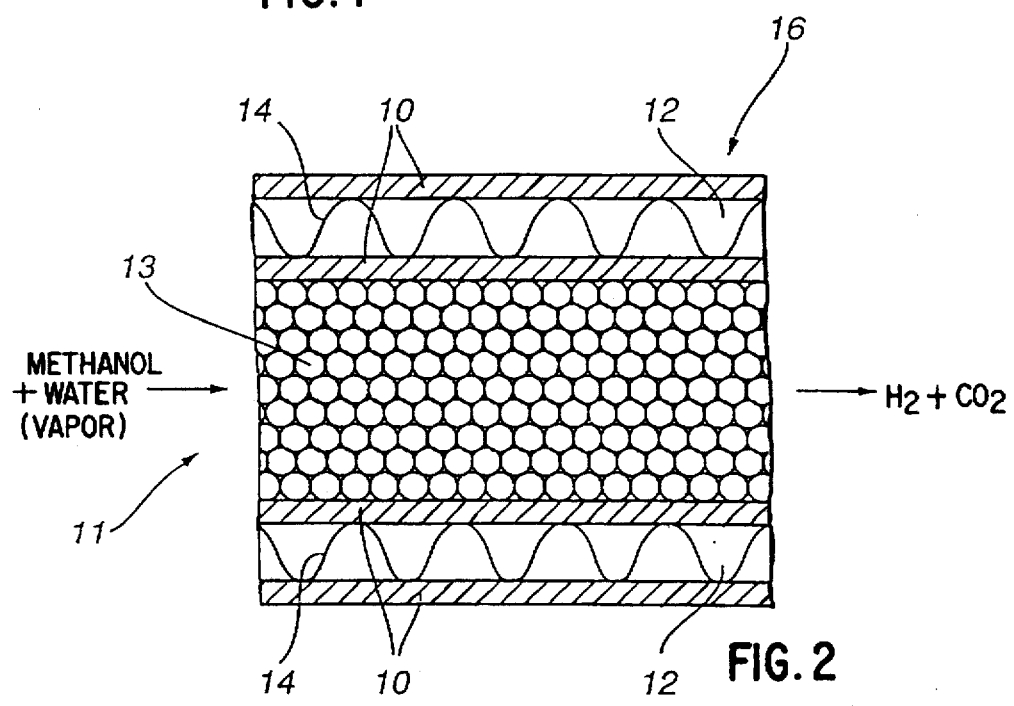
FIG. 2 is a cross-sectional view of an embodiment of a plate-shaped reactor.
Figure 3:
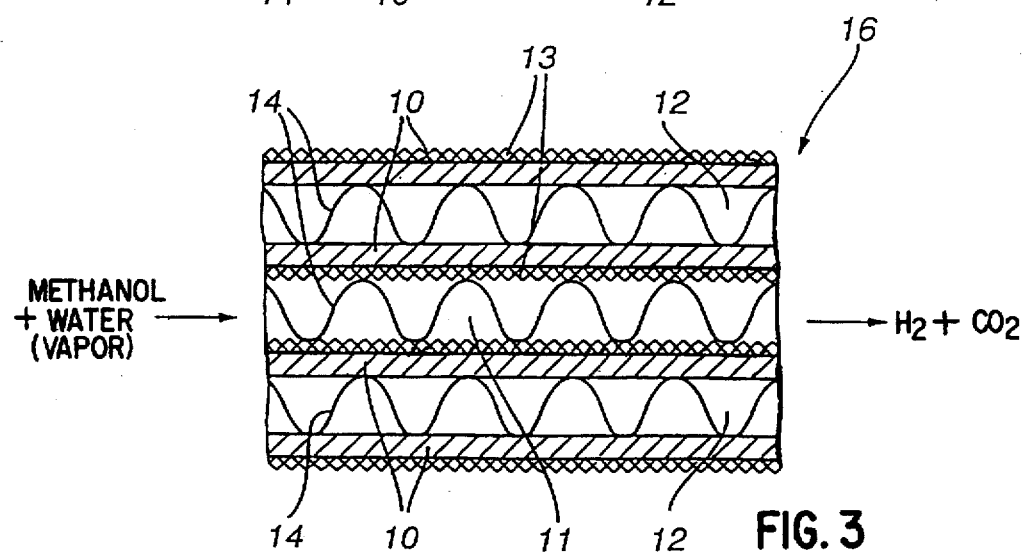
FIG. 3 is a cross-sectional view of another embodiment of a plate-shaped reactor.

FIG. 3 illustrates another embodiment, in which case identical components have the same reference numbers as in FIG. 2. In contrast to FIG. 2, no catalyst charge 13 is used in this case, but the interior sides of the separating plates 10 which face the reaction ducts 11 are coated with a suitable catalyst material 13. In order to ensure the stability of the arrangement and to distribute the gas flow, in the case of this arrangement, a supporting or flow guiding structure 14 is also inserted in the reaction ducts 11. This structure 14 may also be coated with catalyst material 13. It is also possible in this case to integrate the supporting or flow guiding structure 14 for the heating ducts 12 and/or the reaction ducts 11 directly in the separating plates 10. Instead of coating the separating plates 10 with catalyst material 13, it is also possible to place one or several catalyst mats 13 between the separating plates 10. The reaction ducts 11 are then either formed by separate supporting or flow guiding structures 14 or, for example, by means of stamping or rolling are worked directly into the catalyst mats 13.

If both stages 1, 6 are constructed as plate-shaped reactors, for further reducing the weight, these may particularly easily also be arranged between common end plates.

Figure 4:
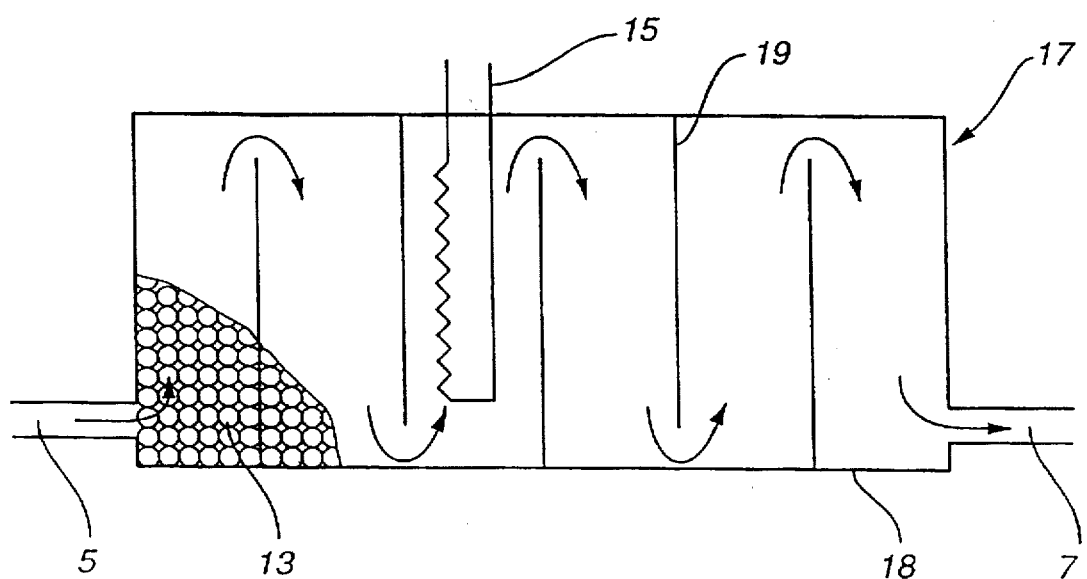
FIG. 4 is an elevational, partly schematic and partly in cross-section, view of an embodiment of a tube-shaped or box-shaped reactor.

FIG. 4 illustrates a tube-shaped or box-shaped reactor 17 which is to be used as the second stage and which is constructed as a simple bulk reactor. On the faces, the housing 18 of the reactor 17 is connected with the connection pipe 5 and with the outlet pipe 7. Inside the housing 18, several parallel-extending deflecting structures 19 are provided which, as in the case of a tube bundle heat exchanger, are each arranged perpendicularly to the longitudinal axis of the housing. As a result, a meandering course of flow is obtained for the gas mixture. For the supply of thermal energy, in addition, one or more heating devices 15 may be provided which consist of a coiled tubing, through which the heat transfer medium flows and which may be ribbed for increasing the heat exchange surface, or of an adequate electric heater. This reactor 17 may be constructed with a large cross-sectional surface so that a favorable ratio is obtained of the reactor mass to the catalyst mass.

Figure 5:
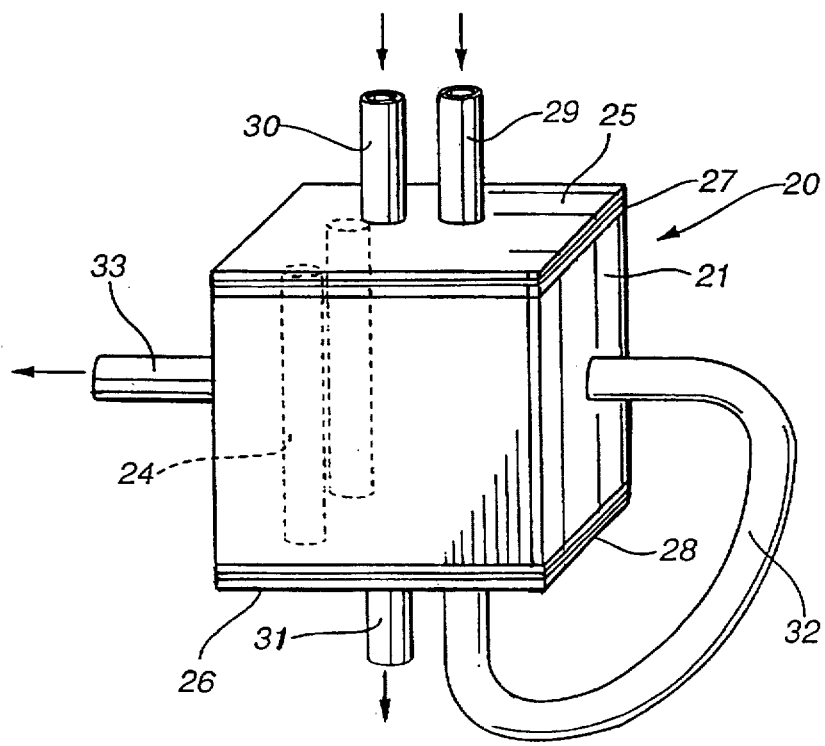
FIG. 5 is a basic representation of a two-stage tube bundle reformer.
Figure 6:
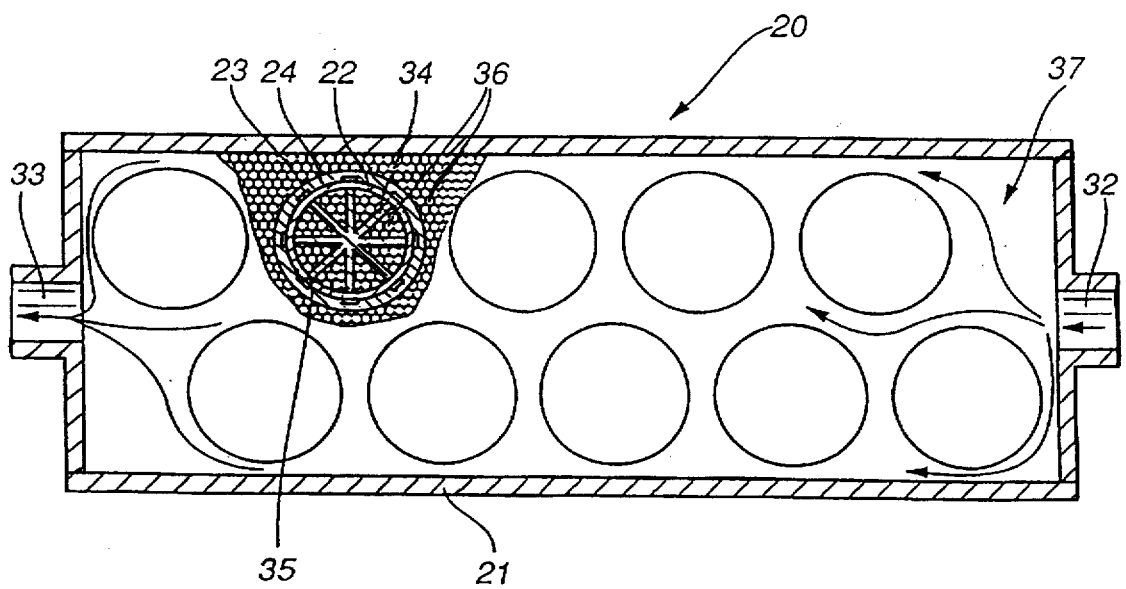
FIG. 6 is a sectional view, which is perpendicular with respect to the reaction tubes, of the arrangement of FIG. 5.

FIGS. 5 and 6 illustrate a reactor which generally has the reference number 20 and in which the two-stage implementation of the reaction takes place in a housing 21. This is a tube bundle reactor with several double tubes arranged in parallel. The interior of the inner tubes 22 is filled with the catalyst 36. For increasing the heat exchange surface, in addition, one insert respectively made of a material with a good heat conducting capacity, preferably made of copper or aluminum, with, for example, a star-shaped cross-section, is fitted into each of the tubes 22. Other measures for increasing the interior heat exchange surface, such as longitudinal or transverse ribs, are also expedient. Outer tubes 24 are arranged concentrically around the inner tubes 22. In the space 23 between the two tubes 22, 24, which is constructed as an annular gap or by means of grooves in the inner or outer tube 22, 24, the heat transfer medium is guided in an axial or spiral-shaped manner. For improving the flow and heat transfer characteristics in space 23, additional structures or inserts may be used. Therefore, the inner tube 22, together with the catalyst 36, the space 23 and the structures or inserts for increasing the heat transfer, form the heat-transfer-optimized first stage of the reactor in which approximately 60–90% of the reaction takes place. As a result, in the first stage, similar to the case of the conventional tube bundle reactor, maximally approximately 50% of the whole reactor volume may be made available to the catalyst 36.

The housing interior 37 outside the outer tubes 34 is also filled with catalyst 36 and therefore represents the second stage of the reactor. In this case also, the supplying of the second stage with process heat is carried out by way of the heat transfer medium from space 23. For increasing the heat exchange surface, the outer tube 24 may have an outer ribbing. However, generally, preferably for reducing the constructional expenditures, the heat exchange surface which relates to the catalyst quantity is smaller than in the first stage.

By means of the spacing of the tubes in the reactor, the space proportion available in the second stage for the catalyst 36 can easily be adjusted from minimally approximately 50% of the overall reactor volume to far above it. In the sum of the first and the second stage, a volume fraction of the catalyst 36 in the overall reactor volume of above 80% can then be achieved in comparison to maximally 50% in the case of conventional tube bundle reactors, whereby the overall reactor becomes more compact. At the same time, the ratio of the catalyst quantity in the first stage to the catalyst quantity in the second stage may vary from approximately 1:1 to preferably 1:4 for optimizing the coordination of the stages. In contrast to the implementation of the reaction according to German OS 36 31 366 A1, both stages are heated here by way of the common heat transfer medium space 23.

Like the plate reactor, the double tube reactor, because of the small gap widths in the heat transfer medium duct, is also particularly well suited for the direct heating by catalytic combustion in the reactor. The advantages and explanations concerning the catalytic direct heating indicated in the case of the plate reactor apply here correspondingly.

The housing 21 has a housing cover 25 and a housing bottom 26, the housing cover 25 and the housing bottom 26 being connected by way of flanged joints 27, 28 on opposite ends with the housing 21. One inlet pipe 29, 30 is arranged on the housing cover 25 for the methanol/water vapor mixture and the other for the heat transfer medium. The distribution of the reform gas and of the heat transfer medium to the individual reaction tubes 22 takes place by way of ducts in the housing cover 25 which are not shown. On the housing bottom 26, the heat transfer medium and the reform gas are collected by way of ducts, which are also not shown, and are removed from the housing 21. While the heat transfer medium is discharged directly by way of an outlet tube 31, the reform gas is supplied again by way of a return tube 32 to the tube reactor 20. For this purpose the return tube 32 leads into a lateral wall of the housing 21. In addition, on the opposite lateral wall of the housing 21, an outlet tube 33 is provided by way of which the reform gas is discharged again from the housing 21.

The bulk material in the reactor tubes 22 preferably has a grain diameter of <2 mm, in which case the inside diameter of the reaction tubes 22 themselves is selected to be preferably <30 mm. In the housing interior 37, a catalyst 36 may be used which has a different sieve fraction, such as a finer grain.

In comparison to conventional tube bundle reactors, another advantage of this arrangement is the particularly small space for the heat transfer medium as well as the high fraction of the catalyst volume in the overall volume. As a result, a good reaction yield can be obtained while the space requirement is reduced.

In addition to the embodiment with the rectangular housing 2 shown here, cylindrical or other housing shapes may also be used. Also, the arrangement of the reaction tubes 22 inside the housing 21 must not be limited to the illustrated embodiment with two offset rows but also comprise other arrangements. In the case of the corresponding construction of the housing cover and the housing bottom, the flow guidance in the reactor as well as the inflow and outflow of the mediums may also have a different design. Thus, for example, the feeding and removal of all mediums can be carried out by way of the housing cover. Likewise, it is possible to deflect, on the inside of the reactor, the reactant flow after the flow through the inner tubes and then return it in parallel to the tube axes in the reverse flow through the catalyst-filled tube exterior. Finally, in addition to the illustrated circular cross-section, the reaction tubes 22 may also have other cross-sectional shapes.

Figure 7:
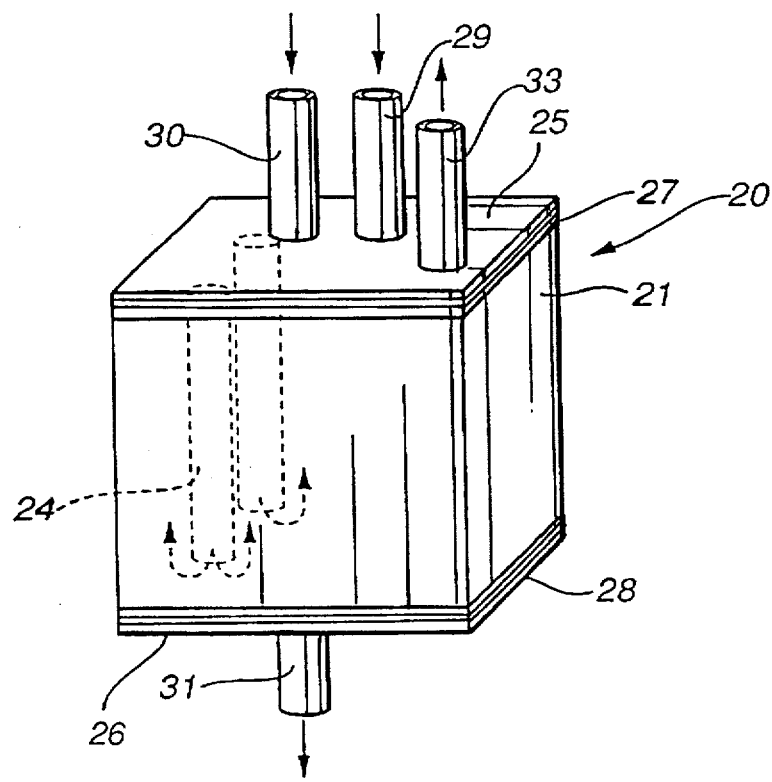
FIG. 7 is a view of another embodiment of a two-stage tube bundle reactor.

This type of an embodiment is illustrated in FIG. 7, in which identical parts have the same reference numbers as in FIGS. 5 and 6. In contrast to the first embodiment, after flowing through the first stage, the reaction gas is guided, by way of the housing bottom 2b, back into the housing interior 37. An external return tube is therefore not necessary. In addition, the outlet tube 33 is not arranged on one of the lateral walls of the housing 21 but is integrated in the housing cover 25. As a result, a gas flow is obtained in the interior 37 which extends essentially in parallel to the reaction tubes 22 but in the opposite direction. Furthermore, the removal of the heat transfer medium may take place by way of the outlet tube 31.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. Two-stage process for the catalytic water vapor reforming of hydrocarbons with the application of heat to the water vapor/hydrocarbon mixture, comprising partially reacting in a reactor the hydrocarbon in the first stage in a heat-transfer-optimized process at a specific catalyst load of at least 10 $Nm^3/h$ $H_2$ per kg catalyst mass, at a nominal load, a heat charge of 60%–90% of the supplied overall amount of heat and a catalyst mass of less than 50% of the overall catalyst mass, and in the second stage which contains more than 50% of the overall catalyst mass, a reaction is carried out at a lower specific catalyst load to thereby complete the overall reaction.

2. A process according to claim 1, wherein in the first stage, a high flow rate is adjusted in the case of a running length of maximally 100 cm and, in the second stage, a lower flow rate is adjusted.

3. A process according to claim 1, wherein the hydrocarbon is methanol, the first stage is operated at a temperature level of from 250°–400° C., and the second stage is operated at a temperature level of from 180°–280° C.

4. Process according to claim 1, further comprising supplying a heat transfer medium to said first stage wherein the first stage is operated at a high temperature gradient between the heat transfer medium and the catalyst.

5. Process according to claim 1, wherein the heat supply in the first stage takes place by means of catalytic combustion directly in the reactor.

* * * * *